(12) United States Patent
Hori et al.

(10) Patent No.: US 8,158,552 B2
(45) Date of Patent: Apr. 17, 2012

(54) EXHAUST GAS PURIFYING CATALYST (75) Inventors: Asuka Hori, Kakegawa (JP); Akimasa Hirai, Kakegawa (JP); Keiichi Narita, Kakegawa (JP)

(73) Assignee: Cataler Corporation, Kakegawa-Shi, Shizuoka (JP)

( * ) Notice: Subject to any disclaimer, the term of this patent is extended or adjusted under 35 U.S.C. 154(b) by 0 days.

(21) Appl. No.: 12/306,861

(22) PCT Filed: Jul. 4, 2007

(86) PCT No.: PCT/JP2007/063382
§ 371 (c)(1),
(2), (4) Date: Dec. 29, 2008

(87) PCT Pub. No.: WO2008/004588
PCT Pub. Date: Jan. 10, 2008

(65) Prior Publication Data
US 2009/0280979 A1 Nov. 12, 2009

(30) Foreign Application Priority Data
Jul. 4, 2006 (JP) ................................ 2006-184660

(51) Int. Cl.
*B01J 23/10* (2006.01)
*B01D 53/94* (2006.01)

(52) U.S. Cl. .................................... 502/304; 423/213.5

(58) Field of Classification Search .................. 502/102, 502/103, 300–307, 319–330, 333, 334, 340, 502/355, 527.12; 423/213.5
See application file for complete search history.

(56) References Cited

U.S. PATENT DOCUMENTS
5,597,771 A * 1/1997 Hu et al. ....................... 502/304
(Continued)

FOREIGN PATENT DOCUMENTS
DE 100 24 994 A1 1/2001
(Continued)

OTHER PUBLICATIONS
European Search Report, Application No. PCT/JP2007063382, Date: Oct. 28, 2010. 7 pages.
(Continued)

*Primary Examiner* — Wayne Langel
*Assistant Examiner* — Syed Iqbal
(74) *Attorney, Agent, or Firm* — Davis & Bujold, P.L.L.C.

(57) ABSTRACT

An exhaust gas purifying catalyst exhibiting high purification performance in the Hot range is provided. The exhaust gas purifying catalyst has a catalyst substrate and a catalyst coating layer formed on the catalyst substrate. The catalyst coating layer has a layered structure including an inside layer a containing the component (a-1) and the component (a-2) described below, and an outside layer b containing the component (b-1) and the component (b-2) described below. Component (a-1) and component (b-1): noble metals. Component (a-2): a compound oxide of (i) Ce, (ii) Zr and (iii) an element selected from the group consisting of rare earth elements, alkaline earth elements and Y, having a ratio of (ii) to (i) within the range of more than 40/100 but not more than 100/2 in terms of the weight ratio between $CeO_2$ and $ZrO_2$. Component (b-2): a compound oxide of elements including at least (v) and (vi) selected among (iv) Ce, (v) Zr and (vi) an element selected from the group consisting of rare earth elements, alkaline earth elements and Y, having a ratio of (v) to (iv) of not more than 40/100 in terms of the weight ratio between $CeO_2$ and $ZrO_2$.

16 Claims, 2 Drawing Sheets

U.S. PATENT DOCUMENTS

| | | | |
|---|---|---|---|
| 6,514,905 B1* | 2/2003 | Hanaki et al. | 502/328 |
| 6,808,687 B1 | 10/2004 | Uenishi et al. | |
| 6,881,384 B1 | 4/2005 | Uenishi et al. | |
| 7,235,511 B2 | 6/2007 | Kawamoto et al. | |
| 2002/0048542 A1* | 4/2002 | Deeba et al. | 423/239.1 |
| 2006/0217263 A1* | 9/2006 | Kawamoto et al. | 502/304 |
| 2006/0270549 A1 | 11/2006 | Sato et al. | |
| 2007/0219089 A1 | 9/2007 | Goto | |
| 2008/0044330 A1* | 2/2008 | Chen et al. | 423/213.5 |
| 2008/0096759 A1* | 4/2008 | Hori et al. | 502/303 |
| 2008/0219906 A1* | 9/2008 | Chen et al. | 423/213.5 |
| 2009/0131251 A1* | 5/2009 | Matsueda et al. | 502/303 |
| 2009/0181847 A1* | 7/2009 | Yabuzaki et al. | 502/339 |

FOREIGN PATENT DOCUMENTS

| | | |
|---|---|---|
| EP | 1 046 423 A2 | 10/2000 |
| EP | 1 053 779 A1 | 11/2000 |
| EP | 1 520 616 A1 | 4/2005 |
| EP | 1 726 359 A1 | 11/2006 |
| EP | 1 834 694 A1 | 9/2007 |
| JP | 10-296085 A | 11/1998 |
| JP | 11-151439 A | 6/1999 |
| JP | 2001-70792 A | 3/2001 |
| JP | 2001-79402 A | 3/2001 |
| JP | 2001-79404 A | 3/2001 |
| JP | 3235640 | 9/2001 |
| JP | 2002-11350 A | 1/2002 |
| JP | 2003 299967 A | 10/2003 |
| JP | 2004-298813 A | 10/2004 |
| JP | 2006-263582 A | 10/2006 |

OTHER PUBLICATIONS

Chinese Office Action dated May 17, 2011 issued in the corresponding Chinese application (CN200780024035.7), including the English Translation thereof.

Office Action for European Application No. 07 790 441.5 dated Dec. 23, 2011. pp. 5.

* cited by examiner

EXHAUST GAS PURIFYING CATALYST

TECHNICAL FIELD

The present invention relates to an exhaust gas purifying catalyst that removes toxic substances contained in exhaust gas from an internal combustion engine of an automobile, a motorcycle and others.

BACKGROUND ART

An exhaust gas purifying catalyst that removes toxic substances, such as CO, HC, NOx and others, contained in exhaust gas emitted from an internal combustion engine of an automobile and others is constituted by coating a substrate made of ceramics or the like with a catalyst containing a refractory inorganic oxide such as cerium-zirconium compound oxide (CeZr compound oxide) and others and a noble metal such as Pd, Pt, Rh and others, thereby to form a catalyst coating layer.

In the exhaust gas purifying catalyst as above, a technique is proposed in which the catalyst coating layer is divided into more than two layers and a weight ratio of cerium oxide and zirconium oxide in each layer is set to a predetermined range, in order to improve high temperature heat resistance and low temperature ignitability (low temperature activation property: a property to be rapidly activated even in a low temperature range) (see Patent Literature 1).

Patent Literature 1: Publication of Japanese Patent No. 3235640

DISCLOSURE OF THE INVENTION

Problems to be Solved by the Invention

In recent years, control on exhaust emissions is tightened on a global basis. As a result, emission reduction is demanded in a Hot range (a state in which an exhaust gas purifying catalyst is heated to 400-600° C.), which was not likely to be a problem until now. However, the conventional exhaust gas purifying catalyst cannot sufficiently meet the demand.

The present invention has been made in view of the above point. An object of the present invention is to provide an exhaust gas purifying catalyst that exhibits high purification performance in the Hot range.

Means to Solve the Problems (1) The invention according to claim 1 provides an exhaust gas purifying catalyst having a catalyst substrate and a catalyst coating layer formed on the catalyst substrate. The catalyst coating layer has a layered structure including an inside layer a containing a component (a-1) and a component (a-2), and an outside layer b containing a component (b-1) and a component (b-2), wherein
Component (a-1): noble metal;
Component (a-2): a compound oxide of (i) Ce, (ii) Zr, and (iii) an element selected from a group consisting of rare earth elements, alkaline earth elements and Y, having a ratio of (ii) to (i) within a range of more than 40/100 but not more than 100/2 in terms of weight ratio between $CeO_2$ and $ZrO_2$;
Component (b-1): noble metal; and
Component (b-2): a compound oxide of elements including at least (v) and (vi) selected among (iv) Ce, (v) Zr, and (vi) an element selected from a group consisting of rare earth elements, alkaline earth elements and Y, and, in case of the compound oxide of elements including (iv)-(vi), having a ratio of (v) to (iv) of not more than 40/100 in terms of weight ratio between $CeO_2$ and $ZrO_2$.

The exhaust gas purifying catalyst of the present invention excels in purification performance in a Hot range by having the above constitution. Here, the Hot range indicates a state in which the temperature of the exhaust gas purifying catalyst has reached 400-600° C.

There is no particular limitation to the catalyst substrate as long as the catalyst substrate is the one generally used for an exhaust gas purifying catalyst. For example, a honeycomb substrate, a corrugated substrate, a monolith honeycomb substrate and others may be employed. The catalyst substrate may be made of any refractory material. For example, an integrally structured type of substrate made of refractory ceramics, such as cordierite or the like, or of metal, such as ferrite stainless steel or the like, can be employed.

Examples the noble metals used for the (a-1) component and the (b-1) component are Rh, Pd, Pt, Os, Ir, Ru and others.

The weight ratio of $CeO_2$ to $ZrO_2$ in the (a-2) component is preferably within a range of more than 40/100 but not more than 100/90, in particular within a range of more than 40/100 but not more than 90/100. The weight ratio within the above range can further improve purification performance in the Hot range.

The weight ratio of $CeO_2$ to $ZrO_2$ in the (b-2) component is preferably within a range of 0/100-30/100, in particular within a range of 0/100-20/100. The weight ratio within the above range can further improve purification performance in the Hot range.

The exhaust gas purifying catalyst of the present invention may contain alumina (especially, activated alumina), Zr oxide, Ce oxide, silica, titania and others, as the refractory inorganic oxide, other than cerium-zirconium compound oxide, in the inside layer a, in the outside layer b, or in the both layers.

Examples of the rare earth elements in the (a-2) component are La, Ce, Pr and Nd, and of the alkaline earth elements in the (a-2) component are Mg, Ca, Sr and Ba.

Examples of the (a-2) component are CeZrLaY compound oxide, CeZrLaBa compound oxide, CeZrNdY compound oxide, CeZrLaNdPr compound oxide, CeZrNdPrCa compound oxide and others.

Examples of the rare earth elements in the (b-2) component are La, Ce, Pr and Nd, and of the alkaline earth elements in the (b-2) component are Mg, Ca, Sr and Ba.

Examples of the (b-2) component are CeZrLaNd compound oxide, CeZrYSr compound oxide, CeZrLaPr compound oxide, CeZrLaY compound oxide and others. The (b-2) component may be any of the above compound oxides excluding Ce.

The catalyst coating layer of the present invention may include only two layers, that is, the inside layer a and the outside layer b. Alternatively, the catalyst coating layer may include another layer, for example, on the outer side of the outside layer b, between the inside layer a and the outside layer b, or on the inner side of the inside layer a.

The outside layer b may contain an oxide of rare earth elements, alkaline earth elements or others as required.

(2) The invention according to claim 2 provides the exhaust gas purifying catalyst as set forth in claim 1 wherein the inside layer a further includes an oxide of an element selected from a group consisting of rare earth elements and alkaline earth elements.

The exhaust gas purifying catalyst of the present invention is all the more excellent in purification performance in the Hot range by the above constitution. The above oxide may be a compound oxide of two or more kinds of elements.

Examples of the rare earth elements and the alkaline earth elements are the same as those listed as the (a-2) component.

(3) The invention according to claim 3 provides the exhaust gas purifying catalyst as set forth in claim 1 or 2 wherein an outer surface of the outside layer b further carries the (b-1) component.

The closer to the surface of the outside layer b, the greater the chances for the components contained in the outside layer b to contact exhaust gas. The exhaust gas purifying catalyst of the present invention carries a noble metal in high concentration near the surface of the outside layer b. Thus, NOx can be more efficiently purified.

(4) The invention according to claim 4 provides the exhaust gas purifying catalyst as set forth in one of claims 1-3 wherein the ratio of (ii) to (i) in the (a-2) component is within a range of more than 40/100 but not more than 100/90 in terms of weight ratio between $CeO_2$ and $ZrO_2$.

Purification performance in the Hot range of the exhaust gas purifying catalyst of the present invention is all the more high by the above constitution.

(5) The invention according to claim 5 provides the exhaust gas purifying catalyst as set forth in one of claims 1-4 wherein the (a-1) component is one or more kind of elements selected from a group consisting of Pd and Pt.

Purification performance in the Hot range of the exhaust gas purifying catalyst of the present invention is all the more high by the above constitution.

The (a-1) component may be Pd, Pt or a combination of Pd and Pt. Moreover, other noble metals may be added to the combination.

(6) The invention according to claim 6 provides the exhaust gas purifying catalyst as set forth in one of claims 1-5 wherein the (b-1) component includes at least Rh.

Purification performance in the Hot range of the exhaust gas purifying catalyst of the present invention is all the more high by the above constitution.

Examples of the (b-1) component of the present invention may be Rh, a combination of Rh and Pt, and others. Moreover, other noble metals may be added to the combination.

EXPLANATION OF REFERENCE NUMERALS

1 . . . exhaust gas purifying catalyst
3 . . . substrate
5 . . . inside layer
7 . . . outside layer
9 . . . surface layer region

BEST MODE FOR CARRYING OUT THE INVENTION

Modes for carrying out the present invention will be explained by way of embodiments.

Figure 1:
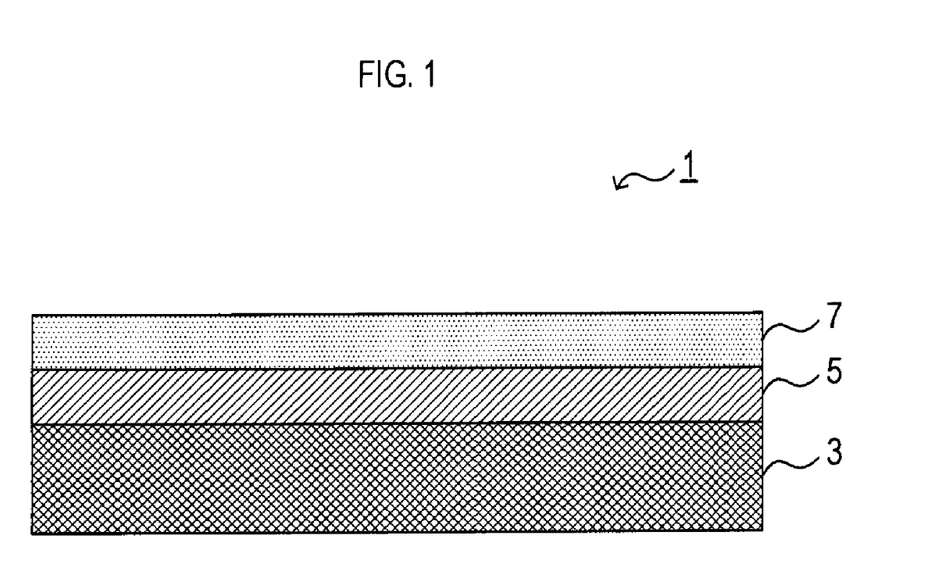
FIG. 1 is an explanatory view showing a structure of an exhaust gas purifying catalyst 1 according to an Embodiment 1.

Embodiment 1 a) A description will now be given on a structure of an exhaust gas purifying catalyst 1 of an Embodiment 1 with reference to FIG. 1.

In the exhaust gas purifying catalyst 1, an inside layer 5 is formed on the surface of a substrate (catalyst substrate) 3, and an outside layer 7 is further formed on top of the inside layer 5. The inside layer 5 and the outside layer 7 function as a catalyst coating layer. The substrate 3 is a monolith honeycomb substrate having a capacity of 1.0 L. The inside layer 5 and the outside layer 7 are formed on the inner face of each cell of the substrate 3.

The inside layer 5 includes Pt (0.5 g) and Pd (2.0 g) as the noble metal, a CeZrLaY compound oxide (100 g (CeZr: 90 g, LaY: 10 g) having a weight ratio of $CeO_2$ to $ZrO_2$ of 80/100 (a ratio of Zr to Ce in the compound oxide is expressed in terms of weight ratio between $CeO_2$ and $ZrO_2$. Hereinafter, the same applies to expression of a ratio in a compound oxide), alumina (50 g), and barium sulfate (20 g).

The outside layer 7 includes Rh (1.0 g) as the noble metal, a CeZrLaNd compound oxide (50 g (CeZr: 45 g, LaNd: 5 g)) having a weight ratio of $CeO_2$ to $ZrO_2$ of 6/100, and alumina (50 g). Table 1 shows compositions of exhaust gas purifying catalysts in the Embodiment 1, later-explained Embodiments 2-14, and Comparative Examples 1-6.

TABLE 1

|  | inside layer | | | outside layer | | |
|---|---|---|---|---|---|---|
|  | (a-1) component | (a-2) component | | (b-1) component | (b-2) component | |
|  | noble metal | Ce/Zr ratio | added element | noble metal | Ce/Zr ratio | added element |
| Embodiment 1 | Pd/Pt | 80/100 | La, Y | Rh | 6/100 | La, Nd |
| Embodiment 2 | Pd/Pt | 80/100 | La, Y | Rh | 0/100 | La, Nd |
| Embodiment 3 | Pd/Pt | 80/100 | La, Y | Rh | 6/100 | Y, Sr |
| Embodiment 4 | Pd/Pt | 80/100 | La, Y | Rh | 6/100 | La, Pr |
| Embodiment 5 | Pd/Pt | 100/100 | La, Y | Rh | 6/100 | La, Nd |
| Embodiment 6 | Pd/Pt | 50/100 | La, Y | Rh | 6/100 | La, Nd |
| Embodiment 7 | Pd/Pt | 80/100 | La, Ba | Rh | 6/100 | La, Nd |
| Embodiment 8 | Pd/Pt | 80/100 | Nd, Y | Rh | 6/100 | La, Nd |
| Embodiment 9 | Pd | 80/100 | La, Nd, Pr | Rh | 6/100 | La, Nd |
| Embodiment 10 | Pd/Pt | 80/100 | Nd, Pr, Ca | Pt/Rh | 6/100 | La, Y |
| Embodiment 11 | Pt | 80/100 | Nd, Y | Rh | 6/100 | La, Nd |
| Embodiment 12 | Pd/Pt | 80/100 | La, Y | Rh(Rh) | 6/100 | La, Nd |
| Embodiment 13 | Pd/Pt | 100/70 | La, Y | Rh | 6/100 | La, Nd |
| Embodiment 14 | Pd/Pt | 80/100 | La, Y | Rh | 20/100 | La, Nd |
| Comp. Ex. 1 | Pd/Pt | 80/100 | La, Y | Rh | 50/100 | La, Nd |
| Comp. Ex. 2 | Pd/Pt | 100/70 | — | Rh | 6/100 | La, Nd |
| Comp. Ex. 3 | Pd/Pt | 30/100 | La, Y | Rh | 6/100 | La, Nd |

TABLE 1-continued

|  | inside layer | | | outside layer | | |
|---|---|---|---|---|---|---|
|  | (a-1) component | (a-2) component | | (b-1) component | (b-2) component | |
|  | noble metal | Ce/Zr ratio | added element | noble metal | Ce/Zr ratio | added element |
| Comp. Ex. 4 | Pd/Pt | 80/100 | — | Rh | 6/100 | La, Nd |
| Comp. Ex. 5 | Pd/Pt | 80/100 | La, Y | Rh | 6/100 | — |
| Comp. Ex. 6 | Pd/Pt | 100/0 | La, Y | Rh | 6/100 | La, Nd | b) A description will now be given on a method of manufacturing the exhaust gas purifying catalyst 1 of the Embodiment 1.

Slurries S1 and S2 were prepared by mixing below listed components.
(Slurry S1)
  Pt nitrate solution: an amount containing 0.5 g of Pt
  Pd nitrate solution: an amount containing 2.0 g of Pd alumina (fine powder, the same applies hereinafter): 50 g
  CeZrLaY compound oxide having a weight ratio of $CeO_2$ to $ZrO_2$ of 80/100: 100 g (CeZr: 90 g, LaY: 10 g)
  barium sulfate: 20 g
  water: 200 g
(Slurry S2)
  Rh Nitrate Solution: an Amount Containing 1.0 G of Rh
  alumina: 50 g
  CeZrLaNd compound oxide having a weight ratio of $CeO_2$ to $ZrO_2$ of 6/100: 50 g (CeZr: 45 g, LaNd: 5 g)
  water: 200 g A total amount of the slurry S1 was applied to coat the entire substrate 3, and dried at 250° C. for an hour. The inside layer 5 was formed by this step. Thereafter, a total amount of the slurry S2 was applied to coat the entire substrate 3 having the slurry S1 previously applied thereon, and dried at 250° C. for an hour. The outside layer 7 was formed by this step. Furthermore, the coated substrate 3 was calcined at 500° C. for an hour thereby to finish the exhaust gas purifying catalyst 1.

Embodiment 2

The exhaust gas purifying catalyst 1 of an Embodiment 2 has basically the same structure as that of the Embodiment 1, but differs in that the outside layer 7 does not contain a CeZrLaNd compound oxide having a weight ratio of $CeO_2$ to $ZrO_2$ of 6/100, but contains a ZrLaNd compound oxide (50 g (Zr: 45 g, LaNd: 5 g)).

The method of manufacturing the exhaust gas purifying catalyst 1 of the Embodiment 2 is basically the same as that of the Embodiment 1. However, in the Embodiment 2, a slurry S3 prepared by mixing below listed components was used in place of the slurry S2 to form the outside layer 7.
(Slurry S3)
  Rh nitrate solution: an amount containing 1.0 g of Rh
  alumina: 50 g
  ZrLaNd compound oxide having a weight ratio of $CeO_2$ to $ZrO_2$ of 0/100: 50 g (Zr: 45 g, LaNd: 10 g)
  water: 200 g In the Embodiment 2, a total amount of the slurry S1 was applied to coat the entire substrate 3, and dried to form the inside layer 5. Thereafter, a total amount of the slurry S3 was applied to coat the entire substrate 3 having the slurry S1 previously applied thereon, dried and calcined to form the outside layer 7. In the Embodiment 2, and in later-explained Embodiments 3-14 and Comparative Examples 1-6, conditions for drying and calcination are the same as in the Embodiment 1.

Embodiment 3

The exhaust gas purifying catalyst 1 of an Embodiment 3 has basically the same structure as that of the Embodiment 1, but differs in that the outside layer 7 does not contain a CeZrLaNd compound oxide, but contains a CeZrYSr compound oxide (50 g (CeZr: 45 g, YSr: 5 g)) including oxides of Y and Sr.

The method of manufacturing the exhaust gas purifying catalyst 1 of the Embodiment 3 is basically the same as that of the Embodiment 1. However, in the Embodiment 3, a slurry S4 prepared by mixing below listed components was used in place of the slurry S2 to form the outside layer 7.
(Slurry S4)
  Rh nitrate solution: an amount containing 1.0 g of Rh
  alumina: 50 g
  CeZrYSr compound oxide having a weight ratio of $CeO_2$ to $ZrO_2$ of 6/100: 50 g (CeZr: 45 g, YSr: 5 g)
  water: 200 g In the Embodiment 3, a total amount of the slurry S1 was applied to coat the entire substrate 3, and dried to form the inside layer 5. Thereafter, a total amount of the slurry S4 was applied to coat the entire substrate 3 having the slurry S1 previously applied thereon, dried and calcined to form the outside layer 7.

Embodiment 4

The exhaust gas purifying catalyst 1 of an Embodiment 4 has basically the same structure as that of the Embodiment 1, but differs in that the outside layer 7 does not contain a CeZrLaNd compound oxide, but contains a CeZrLaPr compound oxide (50 g (CeZr: 45 g, LaPr: 5 g)) including oxides of La and Pr.

The method of manufacturing the exhaust gas purifying catalyst 1 of the Embodiment 4 is basically the same as that of the Embodiment 1. However, in the Embodiment 4, a slurry S5 prepared by mixing below listed components was used in place of the slurry S2 to form the outside layer 7.
(Slurry S5)
  Rh nitrate solution: an amount containing 1.0 g of Rh
  alumina: 50 g
  CeZrLaPr compound oxide having a weight ratio of $CeO_2$ to $ZrO_2$ of 6/100: 50 g (CeZr: 45 g, LaPr: 5 g)
  water: 200 g In the Embodiment 4, a total amount of the slurry S1 was applied to coat the entire substrate 3, and dried to form the inside layer 5. Thereafter, a total amount of the slurry S5 was applied to coat the entire substrate 3 having the slurry S1 previously applied thereon, dried and calcined to form the outside layer 7.

Embodiment 5

The exhaust gas purifying catalyst 1 of an Embodiment 5 has basically the same structure as that of the Embodiment 1, but differs in that the inside layer 5 does not contain a CeZrLaY compound oxide having a weight ratio of $CeO_2$ to $ZrO_2$ of 80/100, but contains a CeZrLaY compound oxide (100 g (CeZr: 90 g, LaY: 10 g)) having a weight ratio of $CeO_2$ to $ZrO_2$ of 100/100.

The method of manufacturing the exhaust gas purifying catalyst 1 of the Embodiment 5 is basically the same as that of the Embodiment 1. However, in the Embodiment 5, a slurry S6 prepared by mixing below listed components was used in place of the slurry S1 to form the inside layer 5.

(Slurry S6)

Pt nitrate solution: an amount containing 0.5 g of Pt
Pd nitrate solution: an amount containing 2.0 g of Pd
alumina: 50 g
CeZrLaY compound oxide having a weight ratio of $CeO_2$ to $ZrO_2$ of 100/100: 100 g (CeZr: 90 g, LaY: 10 g)
barium sulfate: 20 g
water: 200 g In the Embodiment 5, a total amount of the slurry S6 was applied to coat the entire substrate 3, and dried to form the inside layer 5. Thereafter, a total amount of the slurry S2 was applied to coat the entire substrate 3 having the slurry S6 previously applied thereon, dried and calcined to form the outside layer 7.

Embodiment 6

The exhaust gas purifying catalyst 1 of an Embodiment 6 has basically the same structure as that of the Embodiment 1, but differs in that the inside layer 5 does not contain a CeZrLaY compound oxide having a weight ratio of $CeO_2$ to $ZrO_2$ of 80/100, but contains a CeZrLaY compound oxide (100 g (CeZr: 90 g, LaY: 10 g)) having a weight ratio of $CeO_2$ to $ZrO_2$ of 50/100.

The method of manufacturing the exhaust gas purifying catalyst 1 of the Embodiment 6 is basically the same as that of the Embodiment 1. However, in the Embodiment 6, a slurry S7 prepared by mixing below listed components was used in place of the slurry S1 to form the inside layer 5.

(Slurry S7)

Pt nitrate solution: an amount containing 0.5 g of Pt
Pd nitrate solution: an amount containing 2.0 g of Pd
alumina: 50 g
CeZrLaY compound oxide having a weight ratio of $CeO_2$ to $ZrO_2$ of 50/100: 100 g (CeZr: 90 g, LaY: 10 g)
barium sulfate: 20 g
water: 200 g In the Embodiment 6, a total amount of the slurry S7 was applied to coat the entire substrate 3, and dried to form the inside layer 5. Thereafter, a total amount of the slurry S2 was applied to coat the entire substrate 3 having the slurry S7 previously applied thereon, dried and calcined to form the outside layer 7.

Embodiment 7

The exhaust gas purifying catalyst 1 of an Embodiment 7 has basically the same structure as that of the Embodiment 1, but differs in that the inside layer 5 does not contain a CeZrLaY compound oxide, but contains a CeZrLaBa compound oxide (100 g (CeZr: 90 g, LaBa: 10 g)) including oxides of La and Ba.

The method of manufacturing the exhaust gas purifying catalyst 1 of the Embodiment 7 is basically the same as that of the Embodiment 1. However, in the Embodiment 7, a slurry S8 prepared by mixing below listed components was used in place of the slurry S1 to form the inside layer 5.

(Slurry S8)

Pt nitrate solution: an amount containing 0.5 g of Pt
Pd nitrate solution: an amount containing 2.0 g of Pd
alumina: 50 g
CeZrLaBa compound oxide having a weight ratio of $CeO_2$ to $ZrO_2$ of 80/100: 100 g (CeZr: 90 g, LaBa: 10 g)
barium sulfate: 20 g
water: 200 g In the Embodiment 7, a total amount of the slurry S8 was applied to coat the entire substrate 3, and dried to form the inside layer 5. Thereafter, a total amount of the slurry S2 was applied to coat the entire substrate 3 having the slurry S8 previously applied thereon, dried and calcined to form the outside layer 7.

Embodiment 8

The exhaust gas purifying catalyst 1 of an Embodiment 8 has basically the same structure as that of the Embodiment 1, but differs from the Embodiment 1 in that the inside layer 5 does not contain a CeZrLaY compound oxide, but contains a CeZrNdY compound oxide (100 g (CeZr: 90 g, NdY: 10 g)) including oxides of Nd and Y.

The method of manufacturing the exhaust gas purifying catalyst 1 of the Embodiment 8 is basically the same as that of the Embodiment 1. However, in the Embodiment 8, a slurry S9 prepared by mixing below listed components was used in place of the slurry S1 to form the inside layer 5.

(Slurry S9)

Pt nitrate solution: an amount containing 0.5 g of Pt
Pd nitrate solution: an amount containing 2.0 g of Pd
alumina: 50 g
CeZrNdY compound oxide having a weight ratio of $CeO_2$ to $ZrO_2$ of 80/100: 100 g (CeZr: 90 g, NdY: 10 g)
barium sulfate: 20 g
water: 200 g In the Embodiment 8, a total amount of the slurry S9 was applied to coat the entire substrate 3, and dried to form the inside layer 5. Thereafter, a total amount of the slurry S2 was applied to coat the entire substrate 3 having the slurry S9 previously applied thereon, dried and calcined to form the outside layer 7.

Embodiment 9

The exhaust gas purifying catalyst 1 of an Embodiment 9 has basically the same structure as that of the Embodiment 1, but differs in that the inside layer 5 does not contain a CeZrLaY compound oxide, but contains a CeZrLaNdPr compound oxide (100 g (CeZr: 90 g, LaNdPr: 10 g)) including oxides of La, Nd and Pr. Also, the exhaust gas purifying catalyst 1 of the Embodiment 9 differs from that of the Embodiment 1 in that the noble metals contained in the inside layer 5 are not Pt and Pd, but Pd (3.5 g).

The method of manufacturing the exhaust gas purifying catalyst 1 of the Embodiment 9 is basically the same as that of the Embodiment 1. However, in the Embodiment 9, a slurry S10 prepared by mixing below listed components was used in place of the slurry S1 to form the inside layer 5.

(Slurry S10)
    Pd nitrate solution: an amount containing 3.5 g of Pd
    alumina: 50 g
    CeZrLaNdPr compound oxide having a weight ratio of CeO$_2$ to ZrO$_2$ of 80/100: 100 g (CeZr: 90 g, LaNdPr: 10 g)
    barium sulfate: 20 g
    water: 200 g In the Embodiment 9, a total amount of the slurry S10 was applied to coat the entire substrate 3, and dried to form the inside layer 5. Thereafter, a total amount of the slurry S2 was applied to coat the entire substrate 3 having the slurry S10 previously applied thereon, dried and calcined to form the outside layer 7.

Embodiment 10

The exhaust gas purifying catalyst 1 of an Embodiment 10 has basically the same structure as that of the Embodiment 1, but differs in that the inside layer 5 does not contain a CeZrLaY compound oxide, but contains a CeZrNdPrCa compound oxide (100 g (CeZr: 90 g, NdPrCa: 10 g)) including oxides of Nd, Pr and Ca. Also, the exhaust gas purifying catalyst 1 of the Embodiment 10 differs from that of the Embodiment 1 in that the amount of Pt contained in the inside layer 5 is 0.3 g.

Furthermore, the exhaust gas purifying catalyst 1 of the Embodiment 10 differs from that of the Embodiment 1 in that the outside layer 7 does not contain a CeZrLaNd compound oxide, but contains a CeZrLaY compound oxide (50 g (CeZr: 45 g, LaY: 5 g)) including oxides of La and Y. Also, the exhaust gas purifying catalyst 1 of the Embodiment 10 differs from that of the Embodiment 1 in that the noble metals contained in the outside layer 7 are Pt (0.2 g) and Rh (1.0 g).

The method of manufacturing the exhaust gas purifying catalyst 1 of the Embodiment 10 is basically the same as that of the Embodiment 1. However, in the Embodiment 10, a slurry S11 prepared by mixing below listed components was used in place of the slurry S1 to form the inside layer 5. Also, a slurry S12 prepared by mixing below listed components was used in place of the slurry S2 to form the outside layer 7.

(Slurry S11)
    Pt nitrate solution: an amount containing 0.3 g of Pt
    Pd nitrate solution: an amount containing 2.0 g of Pd
    alumina: 50 g
    CeZrNdPrCa compound oxide having a weight ratio of CeO$_2$ to ZrO$_2$ of 80/100: 100 g (CeZr: 90 g, NdPrCa: 10 g)
    barium sulfate: 20 g
    water: 200 g (Slurry S12)
    Pt nitrate solution: an amount containing 0.2 g of Pt
    Rh nitrate solution: an amount containing 1.0 g of Rh
    alumina: 50 g
    CeZrLaY compound oxide having a weight ratio of CeO$_2$ to ZrO$_2$ of 6/100: 50 g (CeZr: 45 g, LaY: 5 g)
    water: 200 g In the Embodiment 10, a total amount of the slurry S11 was applied to coat the entire substrate 3, and dried to form the inside layer 5. Thereafter, a total amount of the slurry S12 was applied to coat the entire substrate 3 having the slurry S11 previously applied thereon, dried and calcined to form the outside layer 7.

Embodiment 11

The exhaust gas purifying catalyst 1 of an Embodiment 11 has basically the same structure as that of the Embodiment 1, but differs in that the inside layer 5 does not contain a CeZrLaY compound oxide, but contains a CeZrNdY compound oxide (100 g (CeZr: 90 g, NdY: 10 g)) including oxides of Nd and Y. Also, the exhaust gas purifying catalyst 1 of an Embodiment 11 differs from that of the Embodiment 1 in that the noble metals contained in the inside layer 5 are not Pt and Pd, but Pt (1.1 g).

The method of manufacturing the exhaust gas purifying catalyst 1 of the Embodiment 11 is basically the same as that of the Embodiment 1. However, in the Embodiment 11, a slurry S13 prepared by mixing below listed components was used in place of the slurry S1 to form the inside layer 5.

(Slurry S13)
    Pt nitrate solution: an amount containing 1.1 g of Pt
    alumina: 50 g
    CeZrNdY compound oxide having a weight ratio of CeO$_2$ to ZrO$_2$ of 80/100: 100 g (CeZr: 90 g, NdY: 10 g)
    barium sulfate: 20 g
    water: 200 g In the Embodiment 11, a total amount of the slurry S13 was applied to coat the entire substrate 3, and dried to form the inside layer 5. Thereafter, a total amount of the slurry S2 was applied to coat the entire substrate 3 having the slurry S13 previously applied thereon, dried and calcined to form the outside layer 7.

Figure 2:
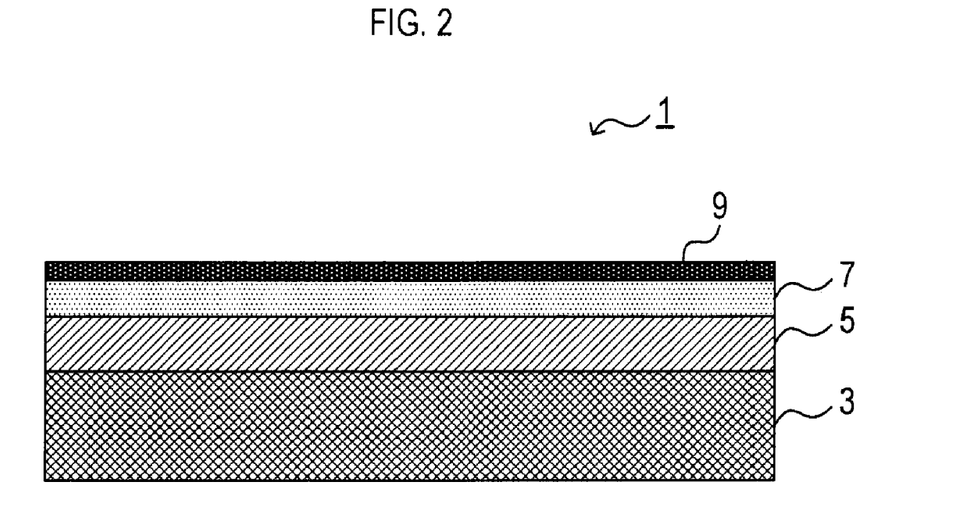
FIG. 2 is an explanatory view showing a structure of an exhaust gas purifying catalyst 1 according to an Embodiment 12.

Embodiment 12 a) The exhaust gas purifying catalyst 1 of an Embodiment 12 has basically the same structure as that of the Embodiment 1, but differs in distribution of Rh contained in the outside layer 7. That is, in the Embodiment 12, as shown in FIG. 2, 0.6 g out of a total amount of 1.0 g of Rh contained in the outside layer 7 is carried being dispersed in the entire outside layer 7. The remainder of 0.4 g of Rh other than the above is further carried in a surface layer region 9 which corresponds to a region of a surface layer in the outside layer 7.

b) A description will now be given on a method of manufacturing the exhaust gas purifying catalyst 1 of the Embodiment 12.

Slurry S14 were prepared by mixing below listed components.

(Slurry S14)
    Rh nitrate solution: an amount containing 0.6 g of Rh
    alumina: 50 g
    CeZrLaNd compound oxide having a weight ratio of CeO$_2$ to ZrO$_2$ of 6/100: 50 g (CeZr: 45 g, LaNd: 5 g)
    water: 200 g Now, a total amount of the slurry S1 as in the above Embodiment 1 was applied to coat the entire substrate 3, and dried at 250° C. for an hour. The inside layer 5 was formed by this step. Thereafter, a total amount of the slurry S14 was applied to coat the entire substrate 3 having the slurry S1 previously applied thereon, and dried at 250° C. for an hour. The outside layer 7 was formed by this step. Furthermore, after calcined at 500° C. for an hour, the substrate 3 was impregnated with a Rh nitrate solution containing 0.4 g of Rh to further carry Rh in the surface layer region 9 which is the outermost surface of the outside layer 7. Thereafter, the impregnated substrate 3 was dried at 250° C. for an hour thereby to finish the exhaust gas purifying catalyst 1.

Embodiment 13

The exhaust gas purifying catalyst 1 of an Embodiment 13 has basically the same structure as that of the Embodiment 1, but differs in that the inside layer 5 does not contain a CeZrLaY compound oxide having a weight ratio of CeO$_2$ to ZrO$_2$ of 80/100, but contains a CeZrLaY compound oxide (100 g (CeZr: 90 g, LaY: 10 g)) having a weight ratio of $CeO_2$ to $ZrO_2$ of 100/70.

The method of manufacturing the exhaust gas purifying catalyst 1 of the Embodiment 13 is basically the same as that of the Embodiment 1. However, in the Embodiment 13, a slurry S15 prepared by mixing below listed components was used in place of the slurry S1 to form the inside layer 5.

(Slurry S15)
Pt nitrate solution: an amount containing 0.5 g of Pt
Pd nitrate solution: an amount containing 2.0 g of Pd
alumina: 50 g
CeZrLaY compound oxide having a weight ratio of $CeO_2$ to $ZrO_2$ of 100/70: 100 g (CeZr: 90 g, LaY: 10 g)
barium sulfate: 20 g
water: 200 g In the Embodiment 13, a total amount of the slurry S15 was applied to coat the entire substrate 3, and dried to form the inside layer 5. Thereafter, a total amount of the slurry S2 was applied to coat the entire substrate 3 having the slurry S15 previously applied thereon, dried and calcined to form the outside layer 7.

Embodiment 14

The exhaust gas purifying catalyst 1 of an Embodiment 14 has basically the same structure as that of the Embodiment 1, but differs in that the outside layer 7 does not contain a CeZrLaNd compound oxide having a weight ratio of $CeO_2$ to $ZrO_2$ of 6/100, but contains a CeZrLaNd compound oxide (50 g (CeZr: 45 g, LaNd: 5 g)) having a weight ratio of $CeO_2$ to $ZrO_2$ of 20/100.

The method of manufacturing the exhaust gas purifying catalyst 1 of the Embodiment 14 is basically the same as that of the Embodiment 1. However, in the Embodiment 14, a slurry S16 prepared by mixing below listed components was used in place of the slurry S2 to form the outside layer 7.

(Slurry S16)
Rh nitrate solution: an amount containing 1.0 g of Rh
alumina: 50 g
CeZrLaNd compound oxide having a weight ratio of $CeO_2$ to $ZrO_2$ of 20/100: 50 g (CeZr: 45 g, LaNd: 5 g)
water: 200 g In the Embodiment 14, a total amount of the slurry S1 was applied to coat the entire substrate 3, and dried to form the inside layer 5. Thereafter, a total amount of the slurry S16 was applied to coat the entire substrate 3 having the slurry S1 previously applied thereon, dried and calcined to form the outside layer 7.

Comparative Example 1

The exhaust gas purifying catalyst 1 of a Comparative Example 1 has basically the same structure as that of the Embodiment 1, but differs in that the outside layer 7 does not contain a CeZrLaNd compound oxide having a weight ratio of $CeO_2$ to $ZrO_2$ of 6/100, but contains a CeZrLaNd compound oxide (50 g (CeZr: 45 g, LaNd: 5 g)) having a weight ratio of $CeO_2$ to $ZrO_2$ of 50/100.

The method of manufacturing the exhaust gas purifying catalyst 1 of the Comparative Example 1 is basically the same as that of the Embodiment 1. However, in the Comparative Example 1, a slurry S17 prepared by mixing below listed components was used in place of the slurry S2 to form the outside layer 7.

(Slurry S17)
Rh nitrate solution: an amount containing 1.0 g of Rh
alumina: 50 g
CeZrLaNd compound oxide having a weight ratio of $CeO_2$ to $ZrO_2$ of 50/100: 50 g (CeZr: 45 g, LaNd: 5 g)
water: 200 g In the Comparative Example 1, a total amount of the slurry S1 was applied to coat the entire substrate 3, and dried to form the inside layer 5. Thereafter, a total amount of the slurry S17 was applied to coat the entire substrate 3 having the slurry S1 previously applied thereon, dried and calcined to form the outside layer 7.

Comparative Example 2

The exhaust gas purifying catalyst 1 of a Comparative Example 2 has basically the same structure as that of the Embodiment 1, but differs in that the inside layer 5 does not contain a CeZrLaY compound oxide having a weight ratio of $CeO_2$ to $ZrO_2$ of 80/100, but contains a CeZr compound oxide (100 g) having a weight ratio of $CeO_2$ to $ZrO_2$ of 100/70.

The method of manufacturing the exhaust gas purifying catalyst 1 of the Comparative Example 2 is basically the same as that of the Embodiment 1. However, in the Comparative Example 2, a slurry S18 prepared by mixing below listed components was used in place of the slurry S1 to form the inside layer 5.

(Slurry S18)
Pt nitrate solution: an amount containing 0.5 g of Pt
Pd nitrate solution: an amount containing 2.0 g of Pd
alumina: 50 g
CeZr compound oxide having a weight ratio of $CeO_2$ to $ZrO_2$ of 100/70: 100 g
barium sulfate: 20 g
water: 200 g In the Comparative Example 2, a total amount of the slurry S18 was applied to coat the entire substrate 3, and dried to form the inside layer 5. Thereafter, a total amount of the slurry S2 was applied to coat the entire substrate 3 having the slurry S18 previously applied thereon, dried and calcined to form the outside layer 7.

Comparative Example 3

The exhaust gas purifying catalyst 1 of a Comparative Example 3 has basically the same structure as that of the Embodiment 1, but differs in that the inside layer 5 does not contain a CeZrLaY compound oxide having a weight ratio of $CeO_2$ to $ZrO_2$ of 80/100, but contains a CeZrLaY compound oxide (100 g (CeZr: 90 g, LaY: 10 g)) having a weight ratio of $CeO_2$ to $ZrO_2$ of 30/100.

The method of manufacturing the exhaust gas purifying catalyst 1 of the Comparative Example 3 is basically the same as that of the Embodiment 1. However, in the Comparative Example 3, a slurry S19 prepared by mixing below listed components was used in place of the slurry S1 to form the inside layer 5.

(Slurry S19)
Pt nitrate solution: an amount containing 0.5 g of Pt
Pd nitrate solution: an amount containing 2.0 g of Pd
alumina: 50 g
CeZrLaY compound oxide having a weight ratio of $CeO_2$ to $ZrO_2$ of 30/100: 100 g (CeZr: 90 g, LaY: 10 g)
barium sulfate: 20 g
water: 200 g In the Comparative Example 3, a total amount of the slurry S19 was applied to coat the entire substrate 3, and dried to form the inside layer 5. Thereafter, a total amount of the slurry S2 was applied to coat the entire substrate 3 having the slurry S19 previously applied thereon, dried and calcined to form the outside layer 7.

Comparative Example 4

The exhaust gas purifying catalyst 1 of a Comparative Example 4 has basically the same structure as that of the Embodiment 1, but differs in that the inside layer 5 does not contain a CeZrLaY compound oxide having a weight ratio of $CeO_2$ to $ZrO_2$ of 80/100, but contains a CeZr compound oxide (100 g) having a weight ratio of $CeO_2$ to $ZrO_2$ of 80/100.

The method of manufacturing the exhaust gas purifying catalyst 1 of the Comparative Example 4 is basically the same as that of the Embodiment 1. However, in the Comparative Example 4, a slurry S20 prepared by mixing below listed components was used in place of the slurry S1 to form the inside layer 5.
(Slurry S20)
  Pt nitrate solution: an amount containing 0.5 g of Pt
  Pd nitrate solution: an amount containing 2.0 g of Pd
  alumina: 50 g
  CeZr compound oxide having a weight ratio of $CeO_2$ to $ZrO_2$ of 80/100: 100 g
  barium sulfate: 20 g
  water: 200 g In the Comparative Example 4, a total amount of the slurry S20 was applied to coat the entire substrate 3, and dried to form the inside layer 5. Thereafter, a total amount of the slurry S2 was applied to coat the entire substrate 3 having the slurry S20 previously applied thereon, dried and calcined to form the outside layer 7.

Comparative Example 5

The exhaust gas purifying catalyst 1 of a Comparative Example 5 has basically the same structure as that of the Embodiment 1, but differs in that the outside layer 7 does not contain a CeZrLaNd compound oxide having a weight ratio of $CeO_2$ to $ZrO_2$ of 6/100, but contains a CeZr compound oxide (50 g) having a weight ratio of $CeO_2$ to $ZrO_2$ of 6/100.

The method of manufacturing the exhaust gas purifying catalyst 1 of the Comparative Example 5 is basically the same as that of the Embodiment 1. However, in the Comparative Example 5, a slurry S21 prepared by mixing below listed components was used in place of the slurry S2 to form the outside layer 7.
(Slurry S21)
  Rh nitrate solution: an amount containing 1.0 g of Rh
  alumina: 50 g
  CeZr compound oxide having a weight ratio of $CeO_2$ to $ZrO_2$ of 6/100: 50 g
  water: 200 g In the Comparative Example 5, a total amount of the slurry S1 was applied to coat the entire substrate 3, and dried to form the inside layer 5. Thereafter, a total amount of the slurry S21 was applied to coat the entire substrate 3 having the slurry S1 previously applied thereon, dried and calcined to form the outside layer 7.

Comparative Example 6

The exhaust gas purifying catalyst 1 of a Comparative Example 6 has basically the same structure as that of the Embodiment 1, but differs in that the inside layer 5 does not contain a CeZrLaY compound oxide having a weight ratio of $CeO_2$ to $ZrO_2$ of 80/100, but contains a CeLaY compound oxide (100 g (Ce: 90 g, LaY: 10 g)).

The method of manufacturing the exhaust gas purifying catalyst 1 of the Comparative Example 6 is basically the same as that of the Embodiment 1. However, in the Comparative Example 6, a slurry S22 prepared by mixing below listed components was used in place of the slurry S1 to form the inside layer 5.
(Slurry S22)
  Pt nitrate solution: an amount containing 0.5 g of Pt
  Pd nitrate solution: an amount containing 2.0 g of Pd
  alumina: 50 g
  CeLaY compound oxide: 100 g (Ce: 90 g, LaY: 10 g)
  barium sulfate: 20 g
  water: 200 g In the Comparative Example 6, a total amount of the slurry S22 was applied to coat the entire substrate 3, and dried to form the inside layer 5. Thereafter, a total amount of the slurry S2 was applied to coat the entire substrate 3 having the slurry S22 previously applied thereon, dried and calcined to form the outside layer 7.
(Performance Evaluation Test)

Now, catalytic performance of the exhaust gas purifying catalysts manufactured in the Embodiments 1 to 14 and the Comparative Examples 1 to 6 was tested as below.

Firstly, the exhaust gas purifying catalyst of each of the Embodiments and the Comparative Examples was attached to a gasoline engine of 4000 cc displacement. Then, a 50-hour durability test was conducted at an average engine revolution of 3,500 rpm and at the exhaust gas temperature at the catalyst entrance of 800° C.

Thereafter, the exhaust gas purifying catalyst in each of the Embodiments and the Comparative Examples is attached to a vehicle of 1,500 cc displacement. The vehicle was run according to the Japanese 10-15 mode and NOx emission discharged from a tail pipe was measured. The Japanese 10-15 mode is a test condition established by the Ministry of Land, Infrastructure, Transport and Tourism for use in an emission certification test, which is a test condition corresponding to the Hot range.

Table 2 shows the test results.

TABLE 2

|  | NOx emission (g/Km) |
| --- | --- |
| Embodiment 1 | 0.0160 |
| Embodiment 2 | 0.0203 |
| Embodiment 3 | 0.0165 |
| Embodiment 4 | 0.0163 |
| Embodiment 5 | 0.0180 |
| Embodiment 6 | 0.0163 |
| Embodiment 7 | 0.0165 |
| Embodiment 8 | 0.0162 |
| Embodiment 9 | 0.0164 |
| Embodiment 10 | 0.0166 |
| Embodiment 11 | 0.0162 |
| Embodiment 12 | 0.0155 |
| Embodiment 13 | 0.0180 |
| Embodiment 14 | 0.0185 |
| Comp. Ex. 1 | 0.0260 |
| Comp. Ex. 2 | 0.0300 |
| Comp. Ex. 3 | 0.0250 |
| Comp. Ex. 4 | 0.0290 |
| Comp. Ex. 5 | 0.0310 |
| Comp. Ex. 6 | 0.0320 |

As shown in Table 2, NOx emission of the exhaust gas purifying catalysts according to the Embodiments 1-14 were notably low as compared to the cases in the Comparative Examples 1-6. From the above experiment, it was confirmed that the exhaust gas purifying catalysts according to the Embodiments 1-14 excels in catalytic performance in the Hot range.

It is to be understood that the present invention should not be limited to the above described embodiments, but may be practiced in various forms within the scope not departing from the present invention.

The invention claimed is:

1. An exhaust gas purifying catalyst comprising:
   a catalyst substrate; and
   a catalyst coating layer formed on the catalyst substrate, the catalyst coating layer having a layered structure including:
   an inside layer (a) containing a component (a-1) and a component (a-2); and
   an outside layer (b) containing a component (b-1) and a component (b-2), and a ratio of the component (a-1) to the component (b-1) being within 3.5:1 to 1.1:1, wherein
   Component (a-1): at least one member selected from the group consisting of Pd and Pt;
   Component (a-2): a compound oxide of (I) Ce, (ii) Zr, and (iii) an element selected from a group consisting of rare earth elements, alkaline earth elements and Y, the compound oxide of Component (a-2) having a ratio of (ii) to (I) within a range of more than 50/100 but not more than 100/70 in terms of weight ratio between $CeO_2$ and $ZrO_2$;
   Component (b-1): noble metal including at least Rh; and
   Component (b-2): a compound oxide of elements selected from a group consisting of (iv) Ce, (v) Zr, and (vi) an element selected from a group consisting of rare earth elements, alkaline earth elements and Y, the compound oxide of Component (b-2) having a ratio of (v) to (iv) of not more than 20/100 in terms of weight ratio between $CeO_2$ and $ZrO_2$,
   the outside layer (b) includes a surface layer region and a region other than the surface layer region, the surface layer region contains an amount of the noble metal component (b-1) and the amount of the noble metal component (b-1) contained in the surface layer region is smaller than an amount of the noble metal component (b-1) contained in the region other than the surface layer region in the outside layer (b).

2. The exhaust gas purifying catalyst according to claim 1, wherein an outer surface of the outside layer (b) further carries the above (b-1) component.

3. The exhaust gas purifying catalyst according to claim 1, wherein the component (a-1) of the inside layer (a) is Pd and Pt and a ratio of Pd:Pt in the component (a-1) of the inside layer (a) is within 4:1 to 2:0.3.

4. The exhaust gas purifying catalyst according to claim 1, wherein the component (a-1) of the inside layer (a) is Pd, and a ratio of the component (a-1) of the inside layer (a) to the noble metal of the outside layer (b) is 3.5:1.

5. The exhaust gas purifying catalyst according to claim 1, wherein the component (a-1) of the inside layer (a) is Pt, and a ratio of the component (a-1) of the inside layer (a) to the noble metal of the outside layer (b) is 1.1:1.

6. The exhaust gas purifying catalyst according to claim 1, wherein
   the Component (a-2) has a ratio of (I) Ce to (ii) Zr within a range from 50/100 to 100/70 in terms of weight ratio between $CeO_2$ and $ZrO_2$, and a ratio of a sum of the amounts of (I) Ce and (ii) Zr to (iii) an element selected from a group consisting of rare earth elements, alkaline earth elements and Y is 9:1; and
   the Component (b-2) has a ratio of (iv) Ce to (v) Zr that is equal to or less than 20/100 in terms of weight ratio between $CeO_2$ and $ZrO_2$, and a ratio of a sum of the amounts of (iv) Ce and (v) Zr to (vi) an element selected from a group consisting of rare earth elements, alkaline earth elements and Y is 9:1.

7. An exhaust gas purifying catalyst comprising:
   a catalyst substrate;
   an inner catalyst layer (a) being supported by the catalyst substrate;
   an outer catalyst layer (b) being supported by the inner catalyst layer (a);
   the inner catalyst layer (a) comprising a noble metal, an oxide compound comprising $CeO_2$ and $ZrO_2$, which have a $ZrO_2$:$CeO_2$ weight ratio greater than 50/100 and less than or equal to 100/70, and an element selected from a group consisting of rare earth elements, alkaline earth elements and Y;
   the outer catalyst layer (b) comprising a noble metal and a compound oxide comprising at least first and second elements of a group consisting of the first element, the second element and a third element, a ratio of the noble metal in the inner catalyst layer (a) to the noble metal in the outer catalyst layer (b) is within 3.5:1 to 1.1:1; and
   the noble metal in the inner catalyst coating layer (a) is at least one member selected from the group consisting of Pd and Pt,
   the noble metal in the outer catalyst coating layer (b) comprises at least Rh;
   the first element being $ZrO_2$;
   the second element being selected from a group consisting of rare earth elements, alkaline earth elements and Y; and
   the third element being $CeO_2$, if the compound oxide of the outer catalyst layer (b) comprises the third element, a $ZrO_2$:$CeO_2$ weight ratio of the first element and the third element is less than or equal to 20/100,
   the outer catalyst layer (b) includes a surface region and a region other than the surface region, the surface region contains an amount of the noble metal of the outer catalyst layer (b) and the amount of the noble metal of the outer catalyst layer (b) contained in the surface region is smaller than an amount of the noble metal of the outer catalyst layer (b) contained in the region other than the surface region.

8. The exhaust gas purifying catalyst according to claim 7, wherein the noble metal of the outer catalyst layer is either Rh or a combination of Pt and the Rh.

9. The exhaust gas purifying catalyst according to claim 7, wherein the noble metal of the inner catalyst layer is at least one member selected from the group consisting of Pd and Pt.

10. The exhaust gas purifying catalyst according to claim 7, wherein the element of the inner catalyst layer (a) selected from the group consisting of rare earth elements, alkaline earth elements and Y is La and Y.

11. The exhaust gas purifying catalyst according to claim 7, wherein the second element of the outer catalyst layer (b) is La and Nd.

12. The exhaust gas purifying catalyst according to claim 7, wherein
   the noble metal of the outer catalyst layer is either Rh or a combination of Pt and Rh;
   the noble metal of the inner catalyst layer is at least one member selected from the group consisting of Pd and Pt;

the element of the inner catalyst layer (a) selected from the group consisting of rare earth elements, alkaline earth elements and Y is La and Y; and the second element of the outer catalyst layer (b) is La and Nd.

13. The exhaust gas purifying catalyst according to claim 7, wherein the noble metal of the inner catalyst layer (a) is Pd and Pt and a ratio of Pd:Pt in the noble metal of the inner catalyst layer (a) is within 4:1 to 2:0.3.

14. The exhaust gas purifying catalyst according to claim 7, wherein the noble metal of the inner catalyst layer (a) is Pd, and a ratio of the noble metal of the inner catalyst layer (a) to the noble metal of the outer catalyst layer (b) is 3.5:1.

15. The exhaust gas purifying catalyst according to claim 7, wherein the noble metal of the inner catalyst layer (a) is Pt, and a ratio of the noble metal of the inner catalyst layer (a) to the noble metal of the outer catalyst layer (b) is 1.1:1.

16. The exhaust gas purifying catalyst according to claim 7, wherein a ratio of a sum of the amounts of Ce and Zr to the element selected from the group consisting of rare earth elements, alkaline earth elements and Y is 9:1 with respect to the oxide compound in the inner catalyst layer and the outer catalyst layer.

* * * * *